United States Patent [19]
Harris et al.

[11] Patent Number: 5,866,259
[45] Date of Patent: Feb. 2, 1999

[54] PRIMER COATING COMPOSITIONS CONTAINING CARBAMATE-FUNCTIONAL ACRYLIC POLYMERS

[75] Inventors: Paul J. Harris, West Bloomfield; Gregory G. Menovcik, Farmington Hills, both of Mich.

[73] Assignee: BASF Corporation, Southfield, Mich.

[21] Appl. No.: 885,638

[22] Filed: Jun. 30, 1997

[51] Int. Cl.$^6$ ..................................................... B32B 27/40
[52] U.S. Cl. ........................................ 428/424.4; 524/507
[58] Field of Search .......................... 524/507; 428/424.4

[56] References Cited

U.S. PATENT DOCUMENTS

| | | | |
|---|---|---|---|
| 4,812,523 | 3/1989 | Toman | 524/512 |
| 4,971,841 | 11/1990 | Panush | 427/407.1 |
| 5,030,514 | 7/1991 | Hartman | 428/363 |
| 5,157,069 | 10/1992 | Campbell | 524/507 |
| 5,344,688 | 9/1994 | Peterson | 428/102 |
| 5,549,962 | 8/1996 | Holmes | 428/144 |
| 5,709,950 | 1/1998 | Burgman | 428/423.1 |

*Primary Examiner*—Paul R. Michl
*Attorney, Agent, or Firm*—Anne Gerry Sabourin

[57] ABSTRACT

Disclosed is a composite coating, comprising a substrate; one or more primer coating layers disposed on said substrate; and at least one topcoat layer disposed on the outermost primer coating layer, wherein said outermost primer coating layer is obtained by reaction of a primer composition comprising an acrylic resin having primary carbamate functionality and an aminoplast resin.

18 Claims, No Drawings

PRIMER COATING COMPOSITIONS CONTAINING CARBAMATE-FUNCTIONAL ACRYLIC POLYMERS

FIELD OF THE INVENTION

The present invention relates to crosslinkable primer coating compositions and particularly to the use of carbamate-functional acrylic polymers with aminoplast crosslinking agents in such primer compositions.

BACKGROUND AND SUMMARY OF THE INVENTION

Coating finishes, particularly exterior coating finishes in the automotive industry, are generally applied in two or more distinct layers. One or more layers of primer coating composition may be applied to the uncoated substrate first, followed by one or more topcoat layers. Each of the layers supplies important properties toward the durability and appearance of the composite coating finish. The primer coating layers may serve a number of purposes. First, the primer coating may be applied in order to promote adhesion between the substrate and the coating. Secondly, the primer coating may be applied in order to improve physical properties of the coating system, such as corrosion resistance or impact strength (e.g., for improving resistance to gravel chipping). Third, the primer coating may be applied in order to improve the appearance of the coating by providing a smooth layer upon which the topcoat layers may be applied. The topcoat layer or layers contribute other properties, such as color, appearance, and light stabilization.

In the process of finishing the exterior of automobiles today, metal substrates are usually first coated with an electrocoat primer. While the electrocoat primer provides excellent surface adhesion and corrosion protection, it is often desirable to apply a second primer layer. The second primer layer may enhance the corrosion protection of the finish, but it also serves to provide a smoother surface than the electrocoat primer. This second primer layer prevents the orange peel of electrocoat surface from telegraphing through to cause the surface of the final topcoat layer to be less than the desired smoothness. The second primer also serves to provide a barrier layer between the electrocoat primer layer, which usually contains aromatic moieties and other materials that can cause yellowing on exposure to sunlight, and the topcoat. Thus, the second primer layer also helps to block low molecular weight, light sensitive species from passing from the electrocoat layer into the topcoat layers where such species could cause a shift in color (yellowing) or other problems.

Rehfuss et al. have disclosed carbamate-functional acrylic polymers in U.S. Pat. No. 5,474,811, incorporated herein by reference. The Rehfuss reference teaches that its carbamate-functional acrylic polymers can be used in clearcoat compositions of color-plus-clear composite coatings. Such clearcoat compositions exhibit improved environmental etch resistance. Primer compositions are not disclosed.

A primer composition has now been discovered that comprises a carbamate-functional acrylic and an aminoplast crosslinker such as a melamine resin crosslinker. The primer composition is used to prepare a composite coating on a substrate, wherein the composite coating comprises at least one primer layer, wherein the outermost primer layer is obtained from applying and reacting the primer composition of the invention, and at least one topcoat layer that is applied onto the outermost primer coating layer.

DETAILED DESCRIPTION

The composite coating of the composition has, as at least one layer, a primer coating layer that is obtained by reaction of a primer composition comprising an acrylic resin having carbamate functionality and an aminoplast resin. In a preferred embodiment, the carbamate functionality of the acrylic resin is primary carbamate functionality. The carbamate-functional resin preferably has at least two carbamate groups per molecule, and preferably it has more than two carbamate groups per molecule, on average. The carbamate functionality may be represented by the structure:

—O—C (=O) —NHR wherein R is H or alkyl, preferably of about 1 to 4 carbon atoms. Preferably, R is H or methyl, and more preferably R is H. When R is H, then the carbamate group is a primary carbamate group. In a preferred embodiment, the carbamate functionality is a β-hydroxy carbamate functionality. A β-hydroxy primary carbamate group may be represented by the structure:

—CH (OH) —CH$_2$—O—C (=O) —NHR, wherein R is as defined before. Again, R is preferably H or methyl, and more preferably R is H (a β-hydroxy primary carbamate group).

The acrylic resin having carbamate functionality may be obtained in at least three ways. In a first way, the acrylic resin may be prepared by copolymerization with an ethylenically unsaturated monomer having at least one carbamate group. Preferably, the carbamate-functional unsaturated monomer has one or more primary carbamate groups. In a second method of obtaining the acrylic resin having carbamate functionality, the acrylic resin may have a functional group that is reacted after the polymerization reaction to attach carbamate functional groups to the already-formed resin. According to this second method, then, the acrylic polymer is formed by copolymerizing an ethylenically unsaturated monomer that has a functional group convertible to a carbamate, preferably a primary carbamate, functionality.

One way to incorporate carbamate functionality is with an ethylenically unsaturated monomer carrying the carbamate functionality in its ester portion. Such monomers are known in the art and are described, for example, in U.S. Pat. Nos. 3,479,328; 3,674,838; 4,126,747; 4,279,833; 4,340,497; and 5,412,049, all of which are incorporated herein by reference. Particularly preferred ethylenically unsaturated monomers with carbamate functionality are 2-hydroxyethyl carbamate (meth)acrylate, 2-hydroxypropyl carbamate (meth)acrylate, and 2-hydroxybutyl carbamate (meth)acrylate.

Carbamate-functional monomers can be prepared by known methods, and polymerized, along with other ethylenically-unsaturated monomers, using techniques well-known in the art. By way of example, one method of synthesizing an α,β-ethylenically unsaturated monomer involves reaction of a hydroxy ester with urea to form the carbamyloxy carboxylate. Another method of forming the carbamyloxy carboxylate is by reaction of an α,β-unsaturated acid with a hydroxy carbamate ester. Another method that results in a carbamate group is one in which ammonia or a primary amine or diamine is reacted with a cyclic carbonate, such as ethylene carbonate or propylene carbonate, followed by esterification of the hydroxyl group with acrylic or methacrylic acid to form the monomer. Preferred acrylics are those described in U.S. Pat. No. 5,474,811, incorporated herein by reference.

A carbamate-functional acrylic resin may also be prepared by reaction of an already-formed polymer with another component to form a carbamate-functional group appended to the polymer backbone, as described in U.S. Pat. No. 4,758,632, which is incorporated herein by reference. Groups that can be converted to carbamate include hydroxyl groups, isocyanate groups, cyclic carbonate groups, oxirane groups, and unsaturated bonds. Of the methods by which this may be done, one useful technique involves thermally decomposing urea to HNCO in the presence of a hydroxy-functional polymer. The reaction of HNCO with the hydroxyl group forms the carbamate group. Another technique involves reacting the hydroxyl groups of a hydroxyalkyl carbamate, such as hydroxypropyl carbamate, with isocyanate groups on the polymer. Isocyanate-functional acrylics are known in the art and are described, for example, in U.S. Pat. No. 4,301,257, incorporated herein by reference. Isocyanate vinyl monomers are well-known in the art and include unsaturated m-tetraethyl xylene isocyanate (commercially available from American Cyanamid under the tradename TMI®).

A third technique involves esterification of hydroxyl groups on an acrylic resin with an alkyl carbamate. Carbamate compounds having lower alkyl groups give faster transesterification. The esterification is catalyzed by Lewis acids, tin or titanate catalysts. Examples of useful catalysts include, without limitation, dibutyltin dilaurate, dibutyltin oxide, and isobutoxy titanate. The reaction is also catalyzed by Bronsted acids, such as para-toluene sulfonic acid, mixtures may also be employed.

Cyclic carbonate groups can be converted to carbamate groups by reaction with ammonia or a primary amine, which ring opens the cyclic carbonate to form a β-hydroxy carbamate. Epoxy groups can be converted to carbamate groups by first converting to a cyclic carbonate group by reaction with carbon dioxide under pressure of from atmospheric up to supercritical $CO_2$ pressures, preferably from about 60 to about 150 psi, and at temperatures typically from about room temperature up to about 200° C., preferably from about 60° to about 150° C. A catalyst may be employed. Useful catalysts include any that activate an oxirane ring, such as tertiary amine or quaternary amine salits, including tetramethylammonium bromide; combinations of complex organotin halides and alkyl phosphonium halides, such as $(CH_3)_3SnI$, $Bu_3SnI$, $Bu_4PI$, and $(CH_3)_4PI$; potassium salts such as potassium carbonate and potassium iodide, preferably in combinatin with crown ethers, tin octoate, or calcium octoate; and the like. The cyclic carbonate group can then be converted to a carbamate group as described above. Unsaturated bonds can be converted to carbamate groups by first reacting with peroxide to form an epoxy group, then with $CO_2$ to form a cyclic carbonate, and finally with ammonia or a primary amine to form the carbamate.

In a preferred embodiment, the acrylic resin is prepared using a monomer having oxirane functionality or cyclic carbonate functionality. Cyclic carbonate-functional acrylic polymers are known in the art and are described, for example, in U.S. Pat. No. 2,979,514, incorporated herein by reference.

In addition to the ethylenically unsaturated monomers having carbamate functionality or used to generate carbamate functionality in the finished polymer, one or more other ethylenically unsaturated monomers are employed as comonomers in forming the acrylic resins of the invention. The comonomers may be any of the type described above as useful in preparation of the hydroxy-functional resin. The carbamate-functional acrylic polymers or acrylic polymers to be adducted to produce a carbamate group are preferably polymerized according to the methods described above.

The monomer having one or more carbamate groups, or groups convertible to carbamate groups may be polymerized along with other unsaturated copolymerizable monomers known in the art. Such copolymerizable monomers include, without limitation, α,β-ethylenically unsaturated monocarboxylic acids containing 3 to 5 carbon atoms and the esters, nitriles, or amides of those acids; α,β-ethylenically unsaturated dicarboxylic acids containing 4 to 6 carbon atoms and the anhydrides, monoesters, and diesters of those acids; vinyl esters, vinyl ethers, vinyl ketones, vinyl amides, and aromatic or heterocyclic aliphatic vinyl compounds. Representative examples of acrylic and methacrylic acids, amides and aminoalkyl amides include, without limitation, such compounds as acrylamide, N-(1,1-dimethyl-3-oxobutyl)-acrylamide, N-alkoxy amides such as methylolamides; N-alkoxy acrylamides such as n-butoxy acrylamide; N-aminoalkyl acrylamides or methacrylamides such as aminomethylacrylamide, 1-aminoethyl-2-acrylamide, 1-aminopropyl-2-acrylamide, 1-aminopropyl-2-methacrylamide, N-1-(N-butylamino)propyl-(3)-acrylamide and 1-aminohexyl-(6)-acrylamide and 1-(N,N-dimethylamino)-ethyl-(2)-methacrylamide, 1-(N,N,-dimethylamino)-propyl-(3)-acrylamide and 1-(N,N-dimethylamino)-hexyl-(6)-methacrylamide.

Representative examples of esters of acrylic, methacrylic, and crotonic acids include, without limitation, those esters from reaction with saturated aliphatic and cycloaliphatic alcohols containing 1 to 20 carbon atoms, such as methyl, ethyl, propyl, isopropyl, n-butyl, isobutyl, tert-butyl, 2-ethylhexyl, lauryl, stearyl, cyclohexyl, trimethylcyclohexyl, tetrahydrofurfuryl, stearyl, sulfoethyl, and isobornyl acrylates, methacrylates, and crotonates; and polyalkylene glycol acrylates and methacrylates.

Representative examples of other ethylenically unsaturated polymerizable monomers include, without limitation, such compounds as fumaric, maleic, and itaconic acids and anhydrides, monoesters, and diesters.

Representative examples of polymerization vinyl monomers include, without limitation, such compounds as vinyl acetate, vinyl propionate, vinyl ethers such as vinyl ethyl ether, vinyl and vinylidene halides, and vinyl ethyl ketone. Representative examples of aromatic or heterocyclic aliphatic vinyl compounds include, without limitation, such compounds as styrene, α-methyl styrene, vinyl toluene, t-butyl styrene, and 2-vinyl pyrrolidone.

The preferred acrylic polymers may be prepared by using conventional techniques, such as free radical polymerization, cationic polymerization, or anionic polymerization, in, for example, a batch or semi-batch process. For instance, the polymerization may be carried out by heating the ethylenically unsaturated monomers in bulk or in organic solution or aqueous dispersion in the presence of a free radical source, such as an organic peroxide or azo compound and, optionally, a chain transfer agent for a batch process; or, alternatively, the monomers, initiator(s), and any chain transfer agent may be fed at a controlled rate into a heated reactor charged with solvent in a semi-batch process.

Typical free radical sources are organic peroxides, including dialkyl peroxides, such as di-tert-butyl peroxide and dicumyl peroxide, peroxyesters, such as tert-butyl peroxy 2-ethylhexanoate and tert-butyl peroxy pivalate; peroxydicarbonates, such as di-2-ethylhexyl peroxydicarbonate and dicyclohexyl peroxydicarbonate; diacyl peroxides, such as dibenzoyl peroxide and dilauroyl peroxide; hydroperoxides, such as cumene hydroperoxide and tert-butyl hydroperoxide; ketone peroxides, such as cyclohexanone peroxide and methylisobutyl ketone peroxide; and peroxyketals, such as 1,1-bis(tert-butyl peroxy)-3,5,5-trimethylcyclohexane and 1,1-bis(tert-butyl peroxy) cyclohexane; as well as azo compounds such as 2,2'-azobis(2-methylbutanenitrile) and 1,1'-azobis (cyclohexanecarbonitrile). Typical chain transfer agents are mercaptans such as octyl mercaptan, n- or tert-dodecyl mercaptan, thiosalicylic acid, mercaptoacetic acid, and mercaptoethanol; halogenated compounds; and dimeric alpha-methyl styrene.

The free radical polymerization is usually carried out at temperatures from about 20° C. to about 200° C., preferably from 90° C. to 170° C. The reaction may conveniently be done at reflux, although reflux is not required. The initiator should be chosen so its half-life at the reaction temperature is preferably no more than thirty minutes.

The acrylic polymer will generally have a number average molecular weight of from about 1000 to about 40,000, preferably from about 2000 to about 10,000, and even more preferably from about 4000 to about 5000. The molecular weight can be determined by gel permeation chromatography using a polystyrene standard. The carbamate equivalent weight will generally be between about 200 and 1500, and more preferably it will fall between about 300 and 340. The theoretical glass transition temperature can be adjusted according to methods well-known in the art through selection and apportionment of the comonomers. In a preferred embodiment, the theoretical $T_g$ of the carbamate-functional acrylic is between about −20° C. and +80° C., more preferably between about 0 and +10. The molecular weight and theoretical $T_g$ of acrylic resin may be optimized for such properties as stone chip resistance or sandability as is done in the art.

It is also possible for the acrylic resin to have other groups reactive with the aminoplast crosslinker, such as hydroxyl groups. For example, acrylic polymers can be prepared by copolymerizing one or more hydroxy-functional ethylenically unsaturated monomers with one or more ethylenically unsaturated monomers having carbamate groups, optionally and preferably along with other polymerizable comonomers.

The compositions of the present invention include aminoplast resins. Suitable aminoplast resins are amine/aldehyde condensates, preferably at least partially etherified, and most preferably fully etherified. Melamine and urea are preferred amines, but other triazines, triazoles, diazines, guanidines, or guanamines may also be used to prepare the alkylated amine/aldehyde aminoplast resins crosslinking agents. The aminoplast resins are preferably amine/formaldehyde condensates, although other aldehydes, such as acetaldehyde, crotonaldehyde, and benzaldehyde, may be used. Non-limiting examples of preferred aminoplast resins include monomeric or polymeric melamine formaldehyde resins, including melamine resins that are partially or fully alkylated using alcohols that preferably have one to six, more preferably one to four, carbon atoms, such as hexamethoxy methylated melamine; urea-formaldehyde resins including methylol ureas and siloxy ureas such as butylated urea formaldehyde resin, alkylated benzoguanimines, guanyl ureas, guanidines, biguanidines, polyguanidines, and the like. Monomeric melamine formaldehyde resins are particularly preferred. The preferred alkylated melamine formaldehyde resins are commercially available, for example from Monsanto Corp., St. Louis, Mo., under the trademark RESIMENE or from Cytec Industries, West Patterson, N.J., under the trademark CYMEL.

The melamine resin preferably comprises from about 15% by weight to about 40% by weight, and more preferably from about 20% by weight to about 30% by weight, a particularly preferably about 35% by weight of of the primer composition, based upon the combined weight of melamine resin and carbamate functional acrylic resin. One preferred ratio of equivalents is from 1:1 up to 1:1.2 equivalents of carbamate groups to crosslinker reactive groups.

The compositions may include one or more catalysts. Useful catalysts include, without limitation, blocked acid catalysts, such as para-toluene sulfonic acid, dodecylbenzene sulfonic acid, dinonylnaphthylene disulfonic acid, and so on, and particularly these acids blocked with a group that volatilized during the curing reaction. Preferred among these are blocked dodecylbenzene sulfonic acids.

Although the coating compositions of the present invention may be used as powder coatings, the coating compositions preferably further include one or more solvents, preferably selected from organic solvents. In one highly preferred embodiment, the compositions are solvent-borne coating compositions. Preferably, the coating compositions are organic solvent solutions. The solvent may be present in an amount of from about 15 percent to about 99 percent by weight, preferably from about 20 percent to about 80 percent by weight, and more preferably from about 20 percent to about 50 percent by weight.

The selection of particular solvents may be made according to methods well-known in the art. The optimum solvent or mixture of solvents may be arrived at by straightforward testing of the particular mixture. In general, useful solvents will include, without limitation, esters, particularly acetates, propionates, and butyrates, alcohols, ketones, aromatic solvents, glycol ethers and esters, aprotic amides, aprotic sulfoxides, aprotic amines, and suitable mixtures thereof. Non-limiting examples of useful solvents include methyl ethyl ketone, methyl isobutyl ketone, amyl acetate, butyl acetate, ethylene glycol butyl ether, propylene glycol methyl ether acetate, xylene, toluene, isopropanol, butanol, naphtha and other blends of aromatic hydrocarbons, N-methylpyrrolidone, and isobutyl isobutyrate.

The primer coating compositions according to the invention may further include pigments such as are commonly used in the art, including color pigments, corrosion inhibiting pigments, conductive pigments, and filler pigments. Illustrative examples of these are metal oxides, chromates, molybdates, phosphates, and silicates, carbon black, and silicas. The pigments are generally dispersed with resins, preferably with resin compositions including the carbamate-functional acrylic or the melamine resin of the invention, or dispersants and solvent to form pigment pastes using equipment, such as attritors and sand mills, and methods widely-used in the art.

Other conventional materials, such as dyes, flow control or rheology control agents, and so on may be added to the compositions.

The coating compositions of the present invention can be applied over many different substrates, including wood, metals, glass, cloth, plastic, foam, metals, and elastomers. They are particularly preferred as primers on automotive articles, such as metal bodies or elastomeric fascia. When the article is a metallic article, it is preferred to have a layer of electrocoat primer before application of the primer coating composition of the invention.

The primer coating composition of the invention is applied directly to the substrate or over one or more other layers of primer, such as the electrocoat primer. The applied primer coating composition is then cured to form a primer coating layer. The primer coating layer formed from the primer coating composition of the invention is the outermost primer layer of the composite coating. A topcoat composition is applied over the primer coating layer and cured to form a topcoat layer. The substrate at that point is then covered with a composite coating that has at least one layer of primer coating derived from the inventive compositions and at least one layer of topcoat.

In a preferred embodiment, the coating composition of the present invention is overcoated with a topcoat system applied as a color-plus-clear (basecoat-clearcoat) topcoat. Crosslinking compositions are preferred as the topcoat layer or layers. Coatings of this type are well-known in the art. For example, the topcoat is preferably a clearcoat according to U.S. Pat. No. 5,474,811, applied wet-on-wet over a layer of a basecoat composition. Suitable pigmented color coat or basecoat compositions are well-known in the art. Polymers known in the art to be useful in basecoat and clearcoat compositions include, without limitation, acrylics, vinyl, polyurethanes, polycarbonates, polyesters, alkyds, and polysiloxanes. Acrylics and polyurethanes are preferred. Thermoset basecoat and clearcoat compositions are also preferred, and, to that end, preferred polymers comprise one or more kinds of crosslinkable functional groups, such as carbamate, hydroxy, isocyanate, amine, epoxy, acrylate, vinyl, silane, acetoacetate, and so on. The polymer may be self-crosslinking, or, preferably, the composition may include a crosslinking agent such as a polyisocyanate or an aminoplast resin of the kind described above.

Each layer of the composite coatings of the invention can be applied to an article to be coated according to any of a number of techniques well-known in the art. These include, for example, spray coating, dip coating, roll coating, curtain coating, and the like. If an initial electrocoat primer layer is applied to a metallic substrate, the electrocoat primer is applied by electrodeposition. For automotive applications, the primer coating composition of the invention and the topcoat layer or layers are preferably applied by spray coating, particularly electrostatic spray methods. Coating layers of one mil or more are usually applied in two or more coats, separated by a time sufficient to allow some of the solvent to evaporate, or "flash," from the applied layer. The flash may be at ambient or elevated temperatures, for example, the flash may use radiant heat. The coats as applied can be from 0.5 mil up to 3 mils dry, and a sufficient number of coats are applied to yield the desired final coating thickness.

The outermost primer layer, which is formed by reacting the primer compositions of the invention, is reacted before the topcoat is applied. Color-plus-clear topcoats are usually applied wet-on-wet. The compositions are applied in coats separated by a flash, as described above, with a flash also between the last coat of the color composition and the first coat the clear. The two coating layers are then cured simultaneously. Preferably, the cured basecoat layer is 0.5 to 1.5 mils thick, and the cured clear coat layer is 1 to 3 mils, more preferably 1.6 to 2.2 mils, thick.

The coating compositions described are preferably cured with heat. Curing temperatures are preferably from about 70° C. to about 180° C., and particularly preferably from about 170° F. to about 200° F. for a composition including an unblocked acid catalyst, or from about 240° F. to about 275° F. for a composition including a blocked acid catalyst. Typical curing times at these temperatures range from 15 to 60 minutes, and preferably the temperature is chosen to allow a cure time of from about 15 to about 30 minutes. In a preferred embodiment, the coated article is an automotive body or part.

The invention is further described in the following examples. The examples are merely illustrative and do not in any way limit the scope of the invention as described and claimed.

EXAMPLES

Example 1

Preparation of Carbamate-Functional Acrylic Polymer

A round-bottom glass flask equipped with a stirrer, nitrogen line, thermocouple, and monomer addition line was charged with 511.2 grams of propylene glycol monomethyl ether. The contents of the flask were heated to 106° C. A mixture of 469.6 grams glycidyl methacrylate carbonate (commercially available from Dow Chemical Company, Midland, Minn.), 192.5 grams styrene, 467.0 grams ethylhexyl acrylate, 152.0 grams ethylhexyl methacrylate, and 103 grams VAZO® 67 (an azo initiator, available from E.I. Du Pont de Nemours, Wilmington, Del.) was added at a constant rate over about four hours. The temperature was maintained at 106° C. The addition line was flushed with 20 grams of propylene glycol monomethyl ether. After the monomer addition was completed, a solution of 19.2 grams of VAZO® 67 in 44 grams of propylene glycol monomethyl ether was added over a period of 25 minutes. The addition line was again flushed, using 10 grams of propylene glycol monomethyl ether. The product held at 106° C. for an additional hour and forty-five minutes. The measured solids content was 68.55% nonvolatile by weight.

A round-bottom glass flask equipped with a stirrer was charged with 800 grams of the product from the first synthesis and 213 grams of methanol. A gentle stream of ammonia was bubbled into the polymer solution for six hours, with an exotherm peak at 39° C. after two hours. The solution was left for 18 hours, after which an infrared spectroscopy scan indicated that the reaction between carbonate and amine was complete. The polymer solution was heated to distill off the methanol. 195 grams of methanol were recovered.

Example 2

Coating Films Containing Carbamate-Functional Acrylic Polymer and Melamine Crosslinking Agent The carbamate-functional acrylic polymer of Example 1 was formulated into coating compositions using two different melamine resins and three different ratios of melamine resin to acrylic resin.

|  | A | B | C | D | E | F |
|---|---|---|---|---|---|---|
| Acrylic of Example 1 | 120 g | 112.9 g | 105.9 g | 120.0 g | 112.9 g | 105.9 g |
| RESIMENE 717[1] | 17.9 | 23.8 | 29.8 |  |  |  |
| RESIMENE 755[1] |  |  |  | 15.0 | 20.0 | 25.0 |
| Additive[2] | 0.25 | 0.25 | 0.25 | 0.25 | 0.25 | 0.4 |
| catalyst[3] |  |  |  | 5.6 | 5.4 | 5.4 |
| EGBE[4] | 55.6 | 56.7 | 57.8 | 55.7 | 57.8 | 59.8 |

[1]Available from Monsanto Corp., St. Louis, MO.
[2]A 60% by weight solution of polybutyl acrylate in xylene
[3]A solution of isopropylamine-blocked dodecylbenzene sulfonic acid
[4]Ethylene glycol monobutyl ether The coating compositions were applied to electrocoated phosphated steel panels by spray application. Two panels were prepared for each sample. One panel was baked for 20 minutes at 270° F.; the second panel was baked for 25 minutes at 325° F. The coated panels were then tested according to the following test methods: Tukon hardness, ASTM D 1475 (method A); Tape Adhesion, ASTM D 3359; and gravel chip test, ASTM D 3170 and SAE J400.

| Test | A | B | C | D | E | F |
|---|---|---|---|---|---|---|
| Bake: 20' @ 270° F. | | | | | | |
| film thickness | 1.0 | 0.9 | 1.0 | 1.0 | 1.0 | 1.0 |
| Tukon hardness | 5.66 | 6.06 | 7.07 | 10.3 | 11.7 | 12.8 |
| ICA (% removal) | 95P | 80P | 80P | 95T | 100T | 100T |
| gravel test rating | 1 | 1 | 1 | 5 | 3 | 3 |
| Bake: 25' @ 325° F. | | | | | | |
| film thickness | 1.0 | 0.8 | 0.8 | 1.0 | 1.0 | 1.0 |
| Tukon hardness | 7.57 | 9.01 | 10.70 | 11.3 | 13.4 | 14.3 |
| ICA (% removal) | 5T | <1 | <1 | 100T | 100T | 80T |
| gravel test rating | 6 | 7 | 7 | 6 | 4 | 4–5 |

The invention has been described in detail with reference to preferred embodiments thereof. It should be understood, however, that variations and modifications can be made within the spirit and scope of the invention.

What is claimed is:

1. A composite coating, comprising a substrate; at least one primer coating layers disposed on said substrate; and at least one topcoat layer disposed on the outermost primer coating layer, wherein said outermost primer coating layer is obtained by curing a primer composition by the reaction of:
   (a) an acrylic resin having at least one primary carbamate group having a structure of —O—C(=O)—NH$_2$ and
   (b) an aminoplast resin.

2. A composite coating according to claim 1, comprising an electrocoat primer layer in between the substrate and the outermost primer coating layer.

3. A composite coating according to claim 1, comprising as a topcoat system an inner layer of basecoat and an outer layer of clearcoat.

4. A composite coating according to claim 1, wherein said primary carbamate group is a β-hydroxy carbamate functionality.

5. A composite coating according to claim 1, wherein said aminoplast resin comprises a melamine resin.

6. A composite coating according to claim 5, wherein said melamine resin comprises a monomeric melamine resin.

7. A composite coating according to claim 1, wherein said melamine resin comprises a polymeric melamine resin.

8. A composite coating according to claim 1, wherein said acrylic resin having at least one primary carbamate group is obtained by:
   (a) forming an acrylic polymer having oxirane groups;
   (b) reacting said oxirane groups with carbon dioxide to form carbonate groups; and
   (c) reacting said carbonate groups with ammonia.

9. A composite coating according to claim 1, wherein said acrylic resin essentially reacts through said primary carbamate groups in forming the outermost primer coating layer.

10. A method of coating a substrate, comprising the steps of:
    (a) applying a primer coating composition, said primer coating composition comprising an acrylic resin having at least one primary carbamate group having a structure of —O—C(=O)—NH$_2$ and an aminoplast resin;
    (b) curing the applied primer coating composition to form a primer coating layer;
    (c) applying a topcoat composition over the primer coating layer; and
    (d) curing the applied topcoat composition to form a topcoat layer.

11. A method according to claim 10, wherein the primer coating composition is applied over an electrocoat primer layer.

12. A method according to claim 10, wherein the topcoat composition is applied in at least a two layer system as a clearcoat layer wet-on-wet over a basecoat layer.

13. A method according to claim 10, wherein said primary carbamate functionality is a β-hydroxy carbamate functionality.

14. A method according to claim 10, wherein said aminoplast resin comprises a melamine resin.

15. A method according to claim 14, wherein said melamine resin is a monomeric melamine resin.

16. A method according to claim 14, wherein said melamine resin comprises a polymeric melamine resin.

17. A method according to claim 10, wherein said acrylic resin having at least one primary carbamate group is obtained by:
    (a) forming an acrylic polymer having oxirane groups;
    (b) reacting said oxirane groups with carbon dioxide to form carbonate groups; and
    (c) reacting said carbonate groups with ammonia.

18. A method according to claim 10, wherein said acrylic resin essentially reacts through said primary carbamate groups in forming the outermost primer coating layer.

* * * * *